United States Patent Office 3,146,814
Patented Sept. 1, 1964

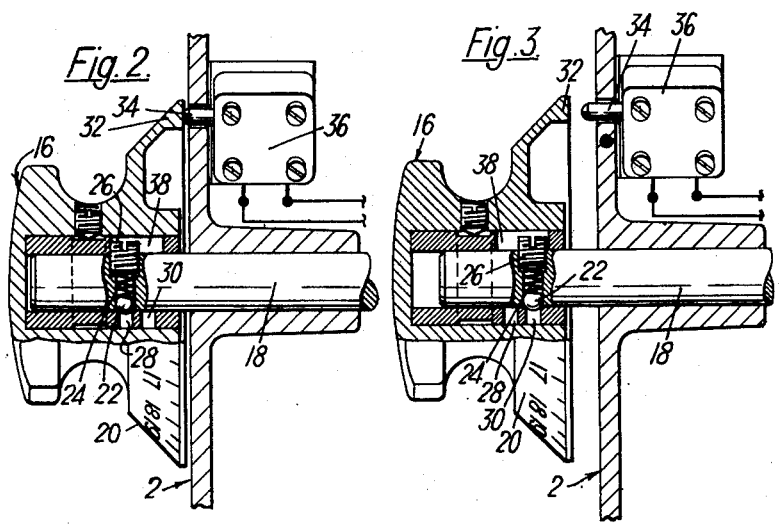
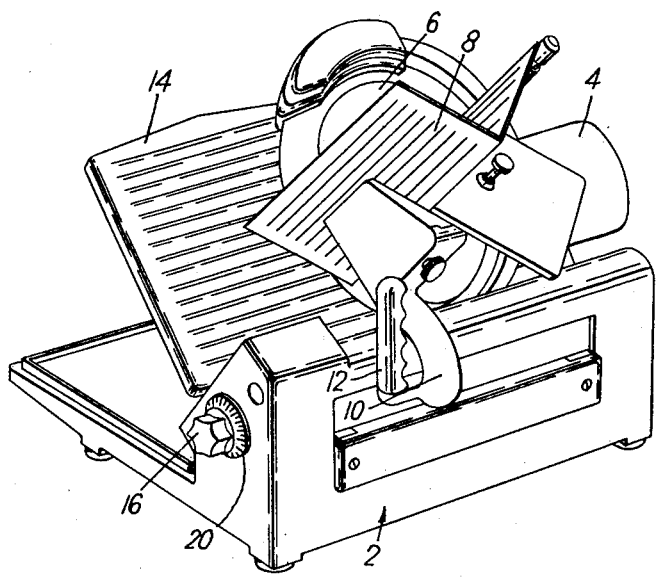

3,146,814
FOOD SLICING MACHINES
Jozef Longin Anecki, Taplow, England, assignor to Lan-Elec Limited, Slough, England, a company of Great Britain
Filed Feb. 23, 1962, Ser. No. 175,065
Claims priority, application, Great Britain,
Oct. 23, 1961, 37,892/61
1 Claim. (Cl. 146—102)

This invention relates to food slicing machines incorporating an electric motor driving a cutting blade.

In such machines, means are normally provided to adjust the depth of cut of the blade so that the thickness of the slices of food can be varied at will. The adjustment is normally controlled by a knob or the like projecting from the machine, rotation of which knob in one direction or the other causing the depth of cut to be increased or decreased respectively. An object of the invention is to simplify the control of this type of food slicing machine.

This object is achieved in accordance with the invention by using the control knob regulating the depth of cut of the blade, also to control the sarting and stopping of the motor for the machine through a switch which is operated by pulling the knob bodily outwardly relatively to the machine casing or by pushing it bodily inwardly.

This arrangement provides a compact and positive combined control of the motor for the machine and of the depth of cut of the blade.

Since the depth of cut adjustment is achieved by rotation of the knob, which is conveniently connected to a spindle or the like, it is necessary to allow for outward and inward movement of the knob relatively to the spindle, or of the spindle relatively to its driven adjustment mechanism. In the former case the knob engages the spindle through a spring biased plunger or ball, which engages in one or other of two holes or recesses in the spindle or in the knob depending upon the position of the knob so that the spindle can be rotated when set in either position. This arrangement also provides a snap action by which a user can tell when the knob is in one or other of its two positions.

An embodiment of a food slicing machine in accordance with the invention is shown by way of example, in the accompanying drawing, in which;

FIGURE 1 is a general perspective view of the machine,

FIGURE 2 is a partial cross-sectional view showing the knob in the position to switch the motor off; and FIGURE 3 is a view corresponding to FIGURE 2 showing the knob in the other of its two positions with the motor switched on.

The machine comprises a body 2 carrying an electric motor 4 provided to drive a circular cutting blade 6. A hopper 8 is carried by an arm 10 which can be moved manually across the blade 6 by a handle 12.

The blade 6 rotates in a plane slightly above its base plate 14 and the distance between the blade and the plate defines the thickness of slices of food cut by the blade from a supply held in the hopper. This distance can be altered between certain limits by rotating a control knob 16 extending from the body 2.

The control knob 16 engages over the outer end of a spindle 18 rotation of which is arranged to alter the depth of cut of the blade 6. The flange 20 of the knob is marked so that the depth can be accurately set. The outer end of the spindle 18 is bored transversely to provide a housing for a ball 22 which is held projecting outwardly from the side of the spindle by a spring 24 and screw 26 which screw-threadedly engages in the other side of the traverse bore.

The interior of the knob is formed with two recesses 28, 30 into which the ball 22 can snap. When the ball is engaged in either one of the recesses the knob is keyed to the spindle so that the spindle is turned on rotation of the knob and the blade 6 moved relatively to its base plate.

In the position shown in FIGURE 2 the ball 22 is engaged in the outermost recess 28 so that the flange of the knob lies adjacent the body of the food slicing machine. In this position the outer edge portion 32 of the flange is arranged to engage an operating plunger 34 for a micro-sensitive switch 36 controlling the motor 4 operating the cutting blade. In the arrangement shown in the drawing the switch is engaged to be opened when its plunger 34 is forced inwardly by the knob.

In the position shown in FIGURE 3 the knob 16 has been pulled outwardly relatively to the machine casing to the position where the ball 22 engages the innermost recess 30 and, the plunger 34, which is spring biased, has moved outwardly to close the switch and energise the motor.

The head of the screw 26 projects outwardly from the spindle to engage in an elongated recess 38 in the interior of the knob to prevent the knob from being pulled completely off the spindle.

I claim:

A food slicing machine comprising a casing, a circular cutting blade mounted for rotation in said casing; a motor for rotating said cutting blade; a base plate on which food to be sliced rests while being fed against the cutting blade; a control knob, rotation of which alters the distance between the base plate and the plane of the cutting blade to vary the depth of cut of said blade; and a switch for said motor, movement of the control knob bodily relatively to said casing operating said switch; a spindle; the control knob being connected to said spindle for adjustment of the depth of cut of the cutting blade; and said spindle having two holes or recesses and said knob having a spring biased ball or plunger to engage in one or other of said holes depending on the position of said knob.

References Cited in the file of this patent

UNITED STATES PATENTS

| | | |
|---|---|---|
| 2,358,223 | Folk | Sept. 12, 1944 |
| 2,558,766 | Lundell | July 3, 1951 |
| 2,598,740 | Zimmermann | June 3, 1952 |